Dec. 30, 1969   W. C. CARLTON   3,486,597
MOULDED ONE-WAY CLUTCH
Filed Nov. 2, 1967
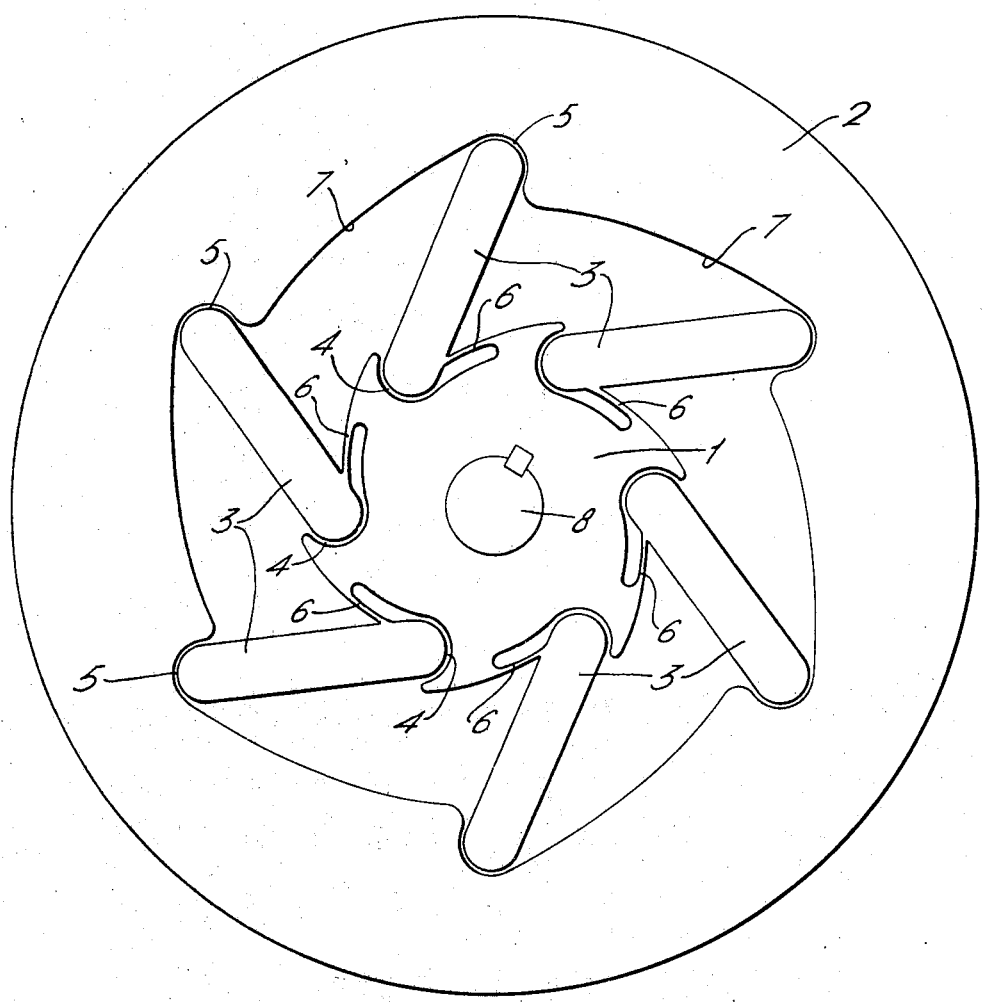

United States Patent Office 3,486,597
Patented Dec. 30, 1969

3,486,597
MOULDED ONE-WAY CLUTCH
William Charles Carlton, "Fitches,"
Finchingfield, England
Filed Nov. 2, 1967, Ser. No. 680,225
Int. Cl. F16d 11/00, 23/00
U.S. Cl. 192—46                                4 Claims

ABSTRACT OF THE DISCLOSURE

A moulded device has first and second rigid members which are relatively movable in one direction and locked against relative movement in at least one other direction by a plurality of locking members which are also rigid. The locking members are arranged between the first and second rigid members and each locking member has one end in pivotal engagement with the first rigid member and the other end locatable by the second rigid member. Each locking member is also integral with the first rigid member via a flexible arm. The locking members are all inclined in the same sense to the direction of relative movement between the first and second members so that when such relative movement takes place the locking members pivot with respect to the first member thereby flexing said flexible arms.

---

This invention relates to moulded devices which comprise relatively movable members and locking means for preventing relative movement between the members in at least one direction.

The invention is especially, although not exclusively applicable to the manufacture of winches. In the case of a winch, this usually comprises a driven rotatable shaft coaxial with a drum around which a rope can be wound. It is required that when the shaft is rotated in one sense the drum should rotate with it to wind up the rope, and hence means are required for locking the drum and shaft together during such rotation. On the other hand in paying out of the rope the drum is required to rotate rapidly in the reverse sense independently of the shaft. Hence the locking means must be such that it is ineffective to lock the drum and shaft together in the said reverse sense of rotation but effective to lock the drum and shaft together in the event of rotation in said one sense. Moreover relative movement between the drum and shaft in the axial direction is to be precluded.

In the case of a winch the forces applied to the device or devices can be very considerable, and hence the locking means must be designed to withstand such forces without collapsing or breaking. This presents considerable design difficulties especially when an effort is made to manufacture the devices in moulded parts. It is an object of this invention to provide a moulded device comprising relatively movable members and locking means for preventing relative movement in at least one direction with a view to overcoming the above mentioned difficulties.

According to the invention there is provided a moulded device incorporating first and second substantially rigid members, relatively movable in one direction, a plurality of rigid locking members which maintain said first and second members in a determined position relative to each other, and each of which has one end in pivotal engagement with said first member, and the other end locatable by said second member, and all of which locking members are inclined in the same sense to said direction of relative movement, and a plurality of flexible arms, one for each locking member and each arm integral with the respective locking member and said first member.

The first and second rigid members may be relatively movable rectilinearly or rotatably.

In one embodiment of the invention in which said first and second rigid members are relatively rotatable, said rigid members are disposed co-axially one within the other, and the respective ends of the locking members are locatable in recesses in the facing surfaces of said first and second rigid members in inclined positions. Moreover the flexible arms which are integral with the respective locking members and said first rigid member are arranged to be substantially relaxed when both ends of the locking members are located in said recesses, but said arms become deflected when one end of each locking member becomes displaced from a recess during relative rotation between the first and second members.

Such a device may be modified to achieve substantial rectilinear relative movement between the first and second rigid members. In such an embodiment the first and second rigid members may be provided with locating recesses for the locking members which are so disposed that said locking members are all inclined in the same sense to the direction of required relative rectilinear movement, and said locking members are each integral with said first member via a flexible arm.

In order that the invention may be clearly understood and readily carried into effect it will now be more fully described with reference to the accompanying drawings in which the single figure shows a moulded device in accordance with one embodiment of the invention.

The invention will be described with reference to an embodiment in which the device comprises first and second relatively rotatable rigid members, the device being especially suitable for incorporation in a winch. In the drawing the two relatively rotatable, substantially rigid members are designated by references 1 and 2, member 1 lying within member 2 in coaxial relationship therewith. The moulded device shown in the drawing also comprises a plurality of locking members 3 each of which is rigid and is disposed between the members 1 and 2 and locatable by said members 1 and 2 in suitably disposed recesses 4 and 5 respectively provided in the facing surfaces of said members 1 and 2. Thus the locking members assist in maintaining the members 1 and 2 in said co-axial relationship with each other. The recesses 4 are arranged to face in the opposite sense to the recesses 5 as shown and the locking members 3 are so disposed that they are all inclined in the same sense with respect to the direction of relative rotation between the members 1 and 2. Moreover each locking member 3 is integrally coupled to one of the members 1 and 2, namely in this embodiment the inner member 1, via a flexible arm 6. Thus the end of each locking member 3 is in pivotal engagement with the member 1 in a recess 4. The member 2 is moulded in one operation and the member 1 is moulded integrally and in the same operation as the members 3 and arms 6.

In one method of operating the device described the member 1 is fixed in position and the member 2 is arranged to be rotated in a clockwise direction as seen in the drawing. As member 2 is rotated, starting from the position shown in the drawing in which the arms 6 are substantially relaxed and the ends of the coupling members 3 are respectively located in recesses 4 and 5, the end of each locking member 3, initially in a recess 5, runs along an inclined surface 7 between adjacent recesses 5 which causes the respective locking member 3 to pivot and thereby flexes the arm 6 with which said locking member 3 is integral. On reaching the next recess 5 said end of the coupling member 3 is urged into said recess 5 by the virtue of the deflection of the flexed arm 6 which then becomes substantially relaxed. Continued rotation of the member 2 causes the outer end of each locking member 3 to engage successively in the recesses 5 around the member 2, positive engagement of the locking members 3 in the recesses 5 being achieved by the alternate deflection and relaxing of the arms 6. It will be appreciated that any tendency for member 2 to rotate relatively to member 1 in the anti-clockwise direction will be prevented by virtue of the engagement of the ends of the inclined rigid locking members 3 in appropriate recesses 4 and 5, and virtually no load is taken by the flexible arms 6.

In an alternative method of operating the device the member 2 is fixed in position and the member 1 is arranged to be rotated in an anti-clockwise direction. The operation is otherwise similar to that already described above, the ends of members 3 initially in recesses 5 moving successively from recess 5 to recess 5 along the inclined surfaces 7. Rotation of the member 1 relatively to member 2 in the clockwise direction is prevented by the engagement of the ends of the inclined locking members 3 in the recesses 4 and 5.

The device shown in the drawing may be incorporated in a winch. By way of example the member 2 may be coupled to or integral with a drum around the periphery of which a rope can be coiled in well known manner, and the member 1 can be mounted on a driving shaft, indicated by reference 8 in the drawing, which is coupled to a handle. Rotation of the handle in a sense to rotate the member 1 in a clockwise direction will cause the member 2 and so the drum to rotate likewise whereas rotation of the handle in a sense to rotate the member 1 in an anti-clockwise direction will cause the locking members 3 to be displaced from one recess 5 to another as the member 1 rotates with respect to the member 2. Moreover the drum can be positively prevented from rotating in the anti-clockwise direction by the provision of yet another device similar to that shown in the drawing which is arranged with its outer rigid member coupled to the drum and its inner rigid member fixed in position. Moreover the locking members in this other device are so arranged that rotation of the outer rigid member in the clockwise direction causes said locking members to be displaced from one recess to another in said outer member, whilst rotation of the outer rigid member in the anti-clockwise direction is prevented by the engagement of the inclined locking members in the recesses in the outer and inner members.

Although in the particular embodiment of the invention described with reference to the accompanying drawing the locking members are integral with the inner rigid member 1, they may alternatively be integral with the outer rigid member 2 via flexible arms similar to the arms 6. In this case when relative rotation takes place between the two rigid members 1 and 2 the ends of the locking members 3 in the recesses 4 will move successively from recess to recess.

What I claim is:

1. A moulded one-way clutch comprising first and second substantially rigid members which are relatively rotatable, one of the members being inside the other; a plurality of rigid locking members each adapted to transmit stresses longitudinally and all of said locking members being inclined to the same extent in the same direction; recesses provided in facing surfaces of the first and second members and adapted to receive the opposite ends of said locking members, the locking members then maintaining said first and second members in a fixed angular position relative to each other; and a plurality of flexible arms, one for each locking member; each flexible arm fixed at one end to a locking member near the end thereof which engages with a recess in said first member, each flexible arm being fixed at its other end to said first member; the flexible arms having a resilient action to effect automatic engagement of the outer ends of the locking members with the recesses provided in said second member, but yielding to permit rotation of said second member relative to said first member.

2. A moulded device as claimed in claim 1 in which said flexible arms are substantially relaxed when said other end of each locking member is located in a recess in the facing surface of said second member and becomes deflected when said other end is displaced from a recess in said facing surface of said second member due to relative rotation between the said first and second members.

3. The invention defined in claim 1, wherein the flexible arms are integral with the rigid locking members and are also integral with said first member.

4. The invention defined in claim 1, wherein the second member has a plurality of inclined surfaces facing the first member, each inclined surface extending between a pair of the recesses provided in the second member and terminating at one end in the bottom or deepest part of a recess in the second member; the inclined surfaces being slidably contacted by the outer ends of said rigid locking members, which enter the recesses in the second member, one after the other, when the second member rotates relative to the first member.

References Cited

UNITED STATES PATENTS

| 844,550 | 2/1907 | Thomasson. | |
|---|---|---|---|
| 1,015,394 | 1/1912 | Mustin. | |
| 3,200,918 | 8/1965 | Horn | 192—46 |

FOREIGN PATENTS

| 474,008 | 5/1951 | Canada. |

MARK M. NEWMAN, Primary Examiner

A. D. HERRMANN, Assistant Examiner